(No Model.)
A. G. BUSBEA & D. HEARN.
COTTON OR CORN CULTIVATOR.
No. 421,548. Patented Feb. 18, 1890.
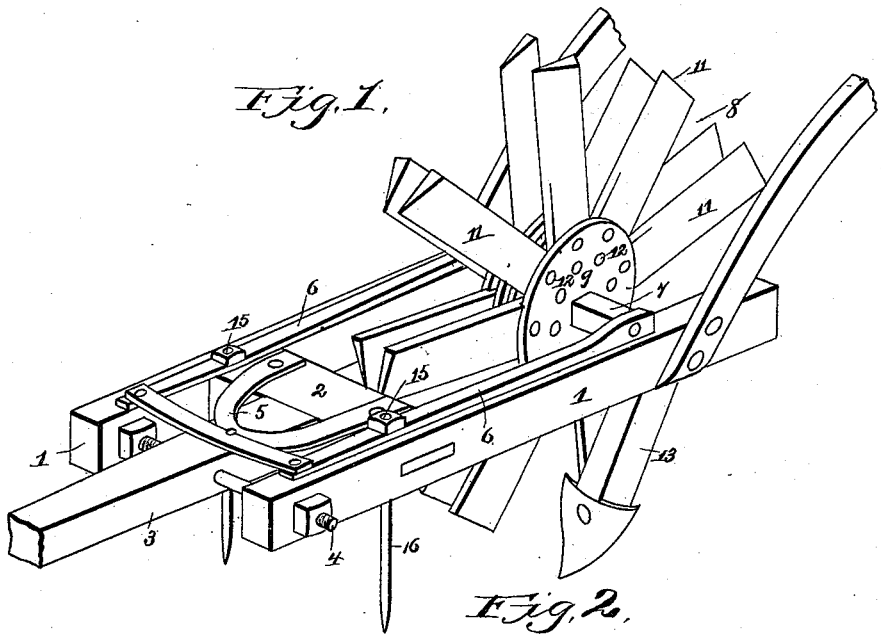
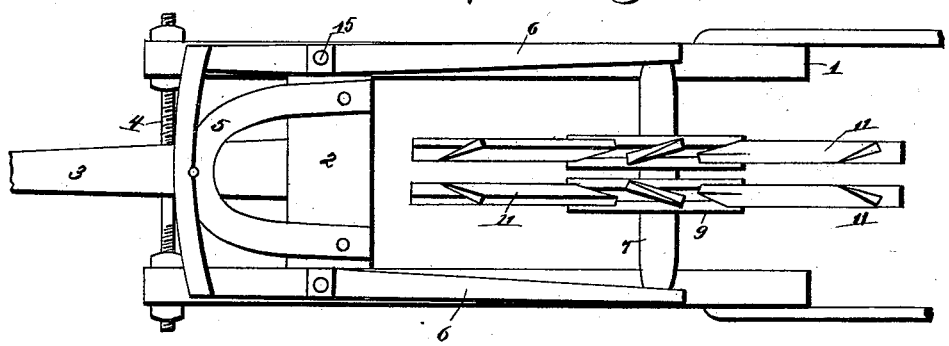
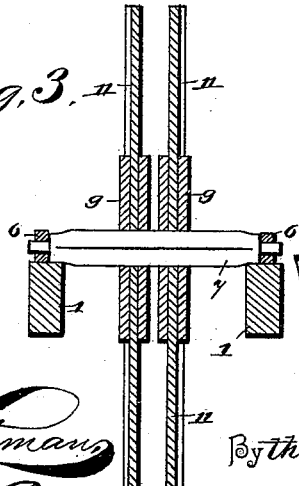
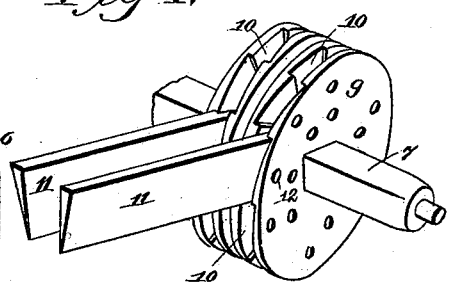
Witnesses
E. Wurdeman
Wm. Bagger
By their Attorneys,
Inventors
Albert G. Busbea and
Damon Hearn
C. A. Snow & Co.

UNITED STATES PATENT OFFICE.

ALBERT G. BUSBEA AND DAMOUS HEARN, OF PAXSON, ARKANSAS.

COTTON OR CORN CULTIVATOR.

SPECIFICATION forming part of Letters Patent No. 421,548, dated February 18, 1890.

Application filed September 9, 1889. Serial No. 323,413. (No model.)

*To all whom it may concern:*

Be it known that we, ALBERT G. BUSBEA and DAMOUS HEARN, citizens of the United States, residing at Paxson, in the county of White and State of Arkansas, have invented a new and useful Cotton or Corn Cultivator, of which the following is a specification.

This invention relates to cultivators for cultivating cotton or corn, more especially the former; and it has for its object to construct a device of this class which shall possess superior advantages in point of simplicity, durability, and general efficiency, and which, when used for the purpose of cultivating cotton, shall serve to protect the strands of young plants from injury and to compress the soil around their roots, so as to leave them in a favorable condition for growing.

With these ends in view the invention consists in the improved construction, arrangement, and combination of parts, which will be hereinafter fully described, and particularly pointed out in the claims.

In the drawings hereto annexed, Figure 1 is a perspective view of our improved cultivator. Fig. 2 is a plan view of the same. Fig. 3 is a vertical transverse sectional view taken through the fender-wheel. Fig. 4 is a detail view showing the construction of the fender-wheel.

Like numerals of reference indicate like parts in all the figures.

The frame of our improved cultivator is composed of the longitudinal side bars 1 1, connected near their front ends by a massive transverse brace 2, to which is secured the forwardly-extending tongue or draft-bar 3, which is connected with the side bars of the frame by a transverse brace 4. A U-shaped brace 5 also connects the draft-bar with the transverse brace 2.

Mounted upon the upper sides of the side bars of the frame are a pair of spring-bars 6 6, the rear ends of which are provided with bearings for the transverse axle 7. Mounted securely upon the latter is the fender-wheel 8, which is composed of two pairs of circular or annular flanged disks 9 9, which may be keyed or otherwise secured upon the shaft or axle, and which are provided in their meeting faces with oblique recesses 10, in which are mounted the radiating fenders 11, which are secured by transverse clamping-bolts 12, that also serve to connect the flanges 9 of each pair together. The said fenders are mounted in pairs between the two pairs of flanged disks, and they are so disposed that their rear edges while in operative position shall be as closely together as may be without danger of injury to the plants, while their front edges shall be spread somewhat apart.

The side beams of the frame are provided near their rear ends with standards, one of which is set slightly in advance of the other, and which are adapted to carry plows or cultivator-blades of ordinary construction. Said standards are designated by 13 14.

The spring-bars 6 6 are connected to the frame-beams by means of bolts or screw-threaded rods 15, having nuts at their upper ends and extended downwardly, as shown at 16, so as to form prongs, which serve to remove weeds and trash from in front of the plows or cultivators.

The operation of this invention will be readily understood from the foregoing description, taken in connection with the drawings hereto annexed. When cultivating young cotton, the machine is run with the fender-wheel astride the row. The plows will stir the soil and cover the plants not protected by the fenders. Stands may thus be left any desired distance apart by increasing or decreasing the number of fenders, and the subsequent use of a cotton-chopper may therefore be entirely dispensed with. The fenders are especially useful when the soil is hard and caked, for the reason that they will cut into the soil on either side of the plants and protect the roots from injury by the plows. Being mounted upon spring-bars, as described, the fender-wheel will readily yield to pressure in an upward direction. When going over the cotton a second time or for cultivating in corn, the fender-wheel may be removed. If the cotton is thin in the drill or if the fenders should miss a stalk and it should be covered by the plows, it may be readily straightened up by the operator, inasmuch as it will not be cut up or injured, as by the use of cotton-choppers of the ordinary description.

Other uses and advantages of our invention will readily suggest themselves to the practical farmer.

Having thus described our invention, we claim and desire to secure by Letters Patent of the United States—

1. The combination, with a supporting-frame, of spring-bars mounted upon the upper side of the same, a rotary axle journaled in bearings at the rear ends of the said spring-bars, and a wheel mounted upon said axle and having radially-extending fenders arranged in pairs obliquely to each other, substantially as and for the purpose set forth.

2. The fender-wheel comprising two pairs of flanged disks having oblique recesses in their meeting faces, the fenders mounted in said recesses and extending radially, and the connecting and clamping bolts, substantially as and for the purpose herein set forth.

3. A fender-wheel for cotton-cultivators having radially-extending fenders arranged in pairs, with their rear edges in operative position closely together and their front edges spread apart, in combination with the plow carrying standards attached to the frame closely adjacent to the sides of the said fender-wheel, substantially as and for the purpose herein set forth.

4. The combination of the supporting-frame, the spring-bars attached to the upper sides of the same by bolts or screw-threaded rods extending downwardly, so as to form weed-gathering prongs or clearers, the shaft or axle mounted in bearings at the rear ends of the said spring-bars, the fender-wheel mounted upon the said axle and having radially-extending fenders arranged in pairs, and the plow carrying standards extending downwardly from the sides of the frame adjacent to said fender-wheel, substantially as and for the purpose set forth.

In testimony that we claim the foregoing as our own we have hereto affixed our signatures in presence of two witnesses.

ALBERT G. $\overset{\text{his}}{\times}$ BUSBEA.
$\phantom{ALBERT G. \times}$ mark
DAMOUS HEARN.

Witnesses:
L. A. VAUGHAN,
W. A. HODGES.